US009165394B2

(12) United States Patent
Chan et al.

(10) Patent No.: US 9,165,394 B2
(45) Date of Patent: Oct. 20, 2015

(54) METHOD AND SYSTEM FOR SUPPORTING GPU AUDIO OUTPUT ON GRAPHICS PROCESSING UNIT

(75) Inventors: Shany-I Chan, Taipei (TW); Ching-Yee Feng, Xindian (TW); Shih-Da Wu, Taipei (TW); Tseng-Ying Lee, Taichung (TW); Li-Kai Cheng, Jhonghe (TW); Li-Ling Chou, Banqiao (TW); Yu-Kuo Chiang, Linkou Township, Taipei County (TW); Yu-Li (David) Ho, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 828 days.

(21) Appl. No.: 12/578,385

(22) Filed: Oct. 13, 2009

(65) Prior Publication Data

US 2011/0087345 A1  Apr. 14, 2011

(51) Int. Cl.
*G06F 17/00* (2006.01)
*G06T 15/00* (2011.01)
*G09G 5/36* (2006.01)
*G06F 3/16* (2006.01)

(52) U.S. Cl.
CPC .............. *G06T 15/005* (2013.01); *G06F 3/162* (2013.01); *G06F 3/165* (2013.01); *G09G 5/363* (2013.01); *G06F 3/16* (2013.01)

(58) Field of Classification Search
CPC ........... G06F 3/16; G06F 3/162; G06F 3/165; G06T 15/005; G09G 5/363
USPC .............................. 345/501, 520, 522; 700/94
See application file for complete search history.

(56) References Cited

U.S. PATENT DOCUMENTS

| 5,508,940 | A | | 4/1996 | Rossmere et al. |
| 5,787,259 | A | * | 7/1998 | Haroun et al. ................ 709/253 |
| 5,870,622 | A | * | 2/1999 | Gulick et al. ................... 712/35 |
| 6,049,316 | A | * | 4/2000 | Nolan et al. .................. 345/698 |
| 6,069,960 | A | * | 5/2000 | Mizukami et al. ............. 381/74 |
| 6,489,963 | B2 | * | 12/2002 | Parikh et al. .................. 345/522 |
| 7,183,891 | B2 | * | 2/2007 | Harris et al. .................... 338/21 |

(Continued)

FOREIGN PATENT DOCUMENTS

TW  200825981 A  6/2008

OTHER PUBLICATIONS

Cuda article: available upon wikipedia from archive.org Aug. 2008.*

(Continued)

*Primary Examiner* — Paul McCord
(74) *Attorney, Agent, or Firm* — Artegis Law Group, LLP

(57) ABSTRACT

The present invention sets forth a method for supporting enhanced audio on a graphics processing unit (GPU) in a computing device having a graphics subsystem. In one embodiment, the method includes the steps of determining whether an option of a GPU audio output is enabled and the graphics subsystem and a first external output device is connected, and routing a first audio stream to the GPU of the graphics subsystem for processing when the option of the GPU audio output is enabled and the graphics subsystem and the first external output device is in connection and causing the processed first audio stream to be transferred along a first transmission path to the first external output device, or otherwise causing a second audio stream to be transferred along a second transmission path to a second external output device.

19 Claims, 5 Drawing Sheets

(56) References Cited

U.S. PATENT DOCUMENTS

| | | | |
|---|---|---|---|
| 7,426,594 B1* | 9/2008 | Riach et al. | 710/244 |
| 7,653,912 B2* | 1/2010 | Frank et al. | 719/318 |
| 8,185,913 B1* | 5/2012 | Talwar et al. | 719/319 |
| 8,200,479 B2* | 6/2012 | Sintes et al. | 704/201 |
| 8,396,578 B2* | 3/2013 | Miyata et al. | 700/94 |
| 8,397,264 B2* | 3/2013 | Ansari et al. | 725/74 |
| 8,452,434 B2* | 5/2013 | Miyata et al. | 700/94 |
| 8,549,529 B1* | 10/2013 | Schildan et al. | 718/104 |
| 8,566,259 B2* | 10/2013 | Chong et al. | 706/12 |
| 8,893,013 B1* | 11/2014 | Groves et al. | 715/740 |
| 2003/0185400 A1* | 10/2003 | Yoshizawa et al. | 381/58 |
| 2006/0026318 A1* | 2/2006 | Lee | 710/72 |
| 2007/0124821 A1* | 5/2007 | Saito | 726/27 |
| 2007/0143801 A1* | 6/2007 | Madonna et al. | 725/80 |
| 2007/0255433 A1* | 11/2007 | Choo | 700/94 |
| 2008/0148063 A1* | 6/2008 | Hanko et al. | 713/189 |
| 2009/0154690 A1* | 6/2009 | Wu | 379/386 |
| 2009/0197640 A1* | 8/2009 | Fa et al. | 455/556.1 |
| 2010/0235847 A1* | 9/2010 | Brehmer et al. | 719/328 |
| 2011/0055838 A1* | 3/2011 | Moyes | 718/102 |

OTHER PUBLICATIONS

Audio and the Graphics Processing Unit; Whalen: copyright 2005.*
High Performance Computing with CUDA: conference overview: presented 2008.*
ATI eyes audio acceleration on the GPU; Stokes: Copyright 2006.*
Intel HD Audio Specification; Copyright 2004.*

* cited by examiner

METHOD AND SYSTEM FOR SUPPORTING GPU AUDIO OUTPUT ON GRAPHICS PROCESSING UNIT

BACKGROUND OF THE INVENTION

1. Field of the Invention

Embodiments of the present invention generally relate to graphics processing unit (GPU), and, more specifically, to a method and a system for supporting a GPU audio output on graphics processing unit.

2. Description of the Related Art

High definition (HD) video and audio enhances user experiences by incorporating HD graphics and audio signals in media such as Blue-Ray discs. Although some computing devices may support both HD graphics signals and HD audio signals, these computing devices typically rely on a dedicated audio subsystem to handle the HD audio signals. The HD audio signals may be presented through audio output devices such as amplifiers. To achieve even better sound quality than the HD audio signals, the computing devices may need to include additional audio processing hardware, which increases the overall cost for such computing devices.

Many graphics systems have more computational resources than required for the preparation and processing of HD graphics signals. As the foregoing illustrates, what is needed in the art is thus a method and a system for supporting an audio output that is processed by the GPU in a cost effective manner, so that the computational resources of a graphics system may be utilized and address at least the foregoing issues.

SUMMARY OF THE INVENTION

One embodiment of the present invention sets forth a method for supporting a GPU audio output on graphics processing unit (GPU) in a graphics subsystem. The method includes the steps of determining whether an option of a GPU audio output is enabled and the graphics subsystem and a first external output device is connected, and routing a first audio stream to the GPU of the graphics subsystem for processing when the option of the GPU audio output is enabled and the graphics subsystem and the first external output device is in connection, and causing the processed first audio stream to be transferred along a first transmission path to the first external output device, or otherwise causing a second audio stream to be transferred along a second transmission path to a second external output device.

At least one advantage of the disclosed method is to enable thread processors of the GPU to support a GPU audio output and output it to an external output device when certain conditions are met.

BRIEF DESCRIPTION OF THE DRAWINGS

So that the manner in which the above recited features of the present invention can be understood in detail, a more particular description of the invention, briefly summarized above, may be had by reference to implementations, some of which are illustrated in the appended drawings. It is to be noted, however, that the drawings illustrate only typical implementations of this invention and are therefore not to be considered limiting of its scope, for the invention may admit to other equally effective implementations.

DETAILED DESCRIPTION

Figure 1:
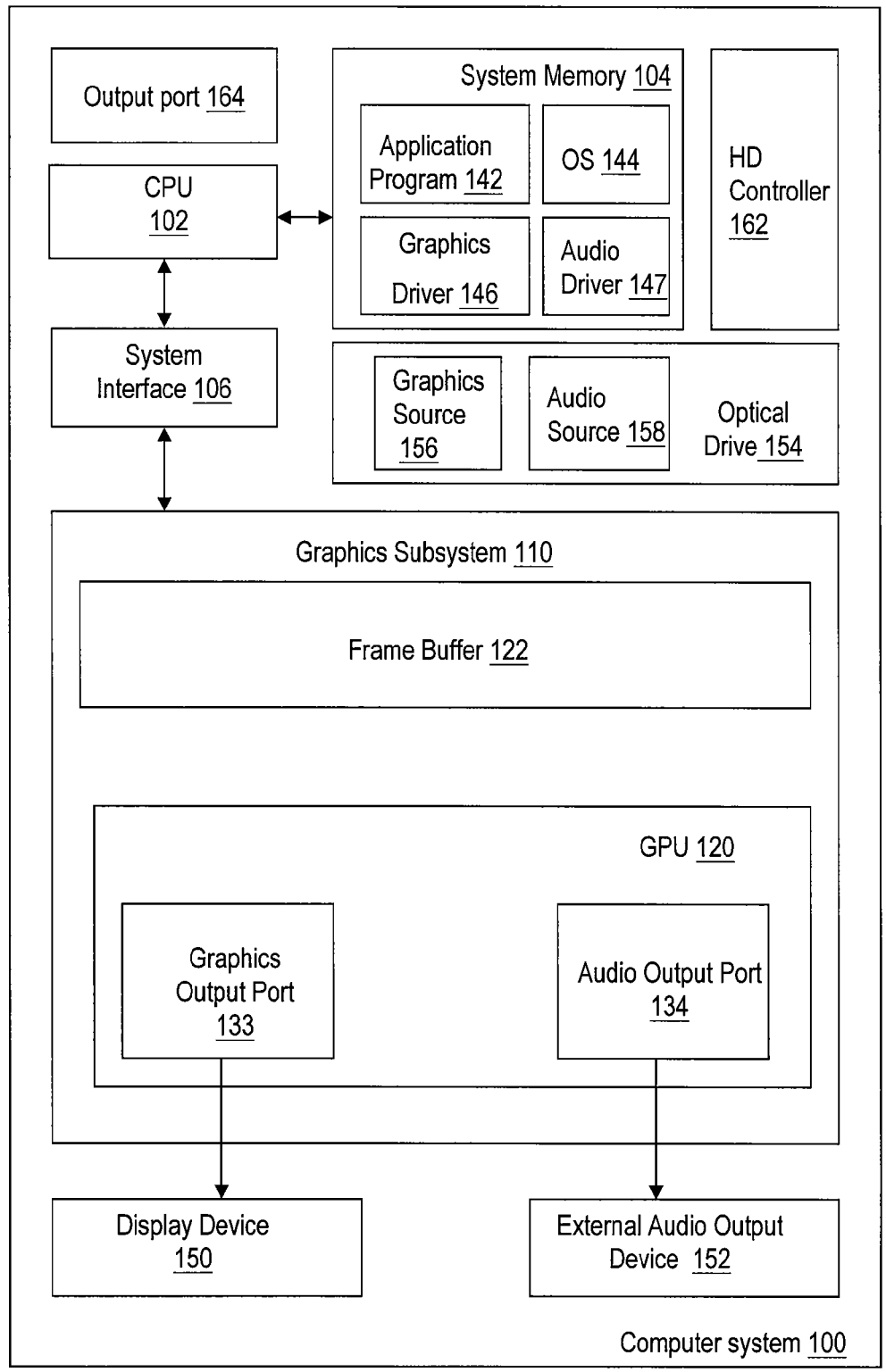
FIG. 1 is a simplified block diagram of a computer system adapted to implement one or more aspects of the present invention.

FIG. 1 is a simplified block diagram of a computer system 100 adapted to implement one or more aspects of the present invention. The computer system 100 may be a desktop computer, server, laptop computer, game console, or the like. The computer system 100 comprises a central processing unit (CPU) 102, a system memory 104, a system interface 106, and a graphics subsystem 110. The CPU 102 connects to the system memory 104 and the graphics subsystem 110 via the system interface 106. The system interface 106 may include a system bus, Accelerated Graphics Port ("AGP") bus, Peripheral Component Interface Express ("PCIE") bus, and other industry standard interfaces adapted to couple the CPU 102 and the graphics subsystem 110.

The graphics subsystem 110 comprises a graphics processing unit (GPU) 120, a frame buffer 122 coupled to the GPU 120. The GPU 120 comprises multiple output ports. In one implementation, at least one of the output ports is configured as a graphics output port 133, and at least one of the output ports is configured as an audio output port 134. The graphics subsystem 110 is configured to be in connection with a first external output device at least through the graphics output port 133. In one implementation, the first external output device is a display device 150 with an audio output. The graphics subsystem 110 may also be configured to be in connection with a second external output device, which in one implementation is an external audio output device 152. While the graphics subsystem 110 is shown to be connected to the one display device 150, it may be connected to multiple display devices. Similarly, although the graphics subsystem 110 is illustrated to be connected to the one external audio output device 152, the graphics subsystem 110 may be connected to multiple external audio output devices.

In one implementation, the system memory 104 contains an application program 142, an operating system (OS) 144, a graphics driver 146, an audio driver 147. The computer system 100 may further comprise an optical drive 154 storing a graphics source 156 and an audio source 158 and a high definition (HD) controller 162. The HD controller 162 is configured to at least convert the audio source 158, regardless of its format, to a HD-based audio signal, and a non-HD audio signal. In one implementation, the optical drive 154 is a digital versatile disc (DVD) player/recorder.

The GPU 120 may be a graphics device designated for general purpose graphics-related computing for the graphics source 156. The audio driver 147 may cause the HD controller 162 to process the audio source 158 to generate a HD-based audio signal. The HD-based audio signal may be further routed to and outputted by the GPU 120. The audio driver 147 may also cause the GPU 120 to process the audio source 158 to a GPU audio signal. Throughout the disclosure, system audio generally refers to an audio signal that is not processed by the GPU 120, and GPU audio generally refers to another audio signal that is processed by the GPU 120. In one implementation, the GPU audio is "Effective Spacious Sound" audio signal.

To generate the GPU audio, the GPU 120 in one implementation may utilize thread processors to encode or decode the audio source 158 and to filter out associated noises.

To generate and output the GPU audio, an option of an output for the GPU audio may be enabled. The option may be offered by the application program 142. In one implementation, in addition to enabling the option, a connection between the external audio device 152 and the graphics subsystem 110 may be required before the GPU audio could be prepared. With both of the conditions satisfied, the GPU audio may be outputted to the external audio device 152.

On the other hand, when the option is not enabled or selected, the GPU 120 may not be caused to process the audio source 158 for the generation of the GPU audio. As a result, the system audio, rather than the GPU audio, may be outputted to the display device 150. In one implementation, the system audio refers to HDMI-based audio, which is a type of the HD-based audio signal. In another implementation, the system audio refers to the non-HD audio signal. The GPU audio may be transmitted through the audio output port 134 to the external audio output device 152, and the system audio such as Sony Philips Digital Interface (SPDIF)-based audio may be transmitted through the graphics output port 133 to the display device 150. In one implementation, the non-HD audio signal may be transmitted to yet another external output device through an output port 164 of the computer system 100 outside of the graphics subsystem 110.

When in operation, the CPU 102 may execute the application program 142, which in turn invoke various functions of the graphics subsystem 110 through the graphics driver 146 and the audio driver 147. One application program 142 may be, for example, a media player that is for playing back the graphics source 156 and the audio source 158.

Figure 2:
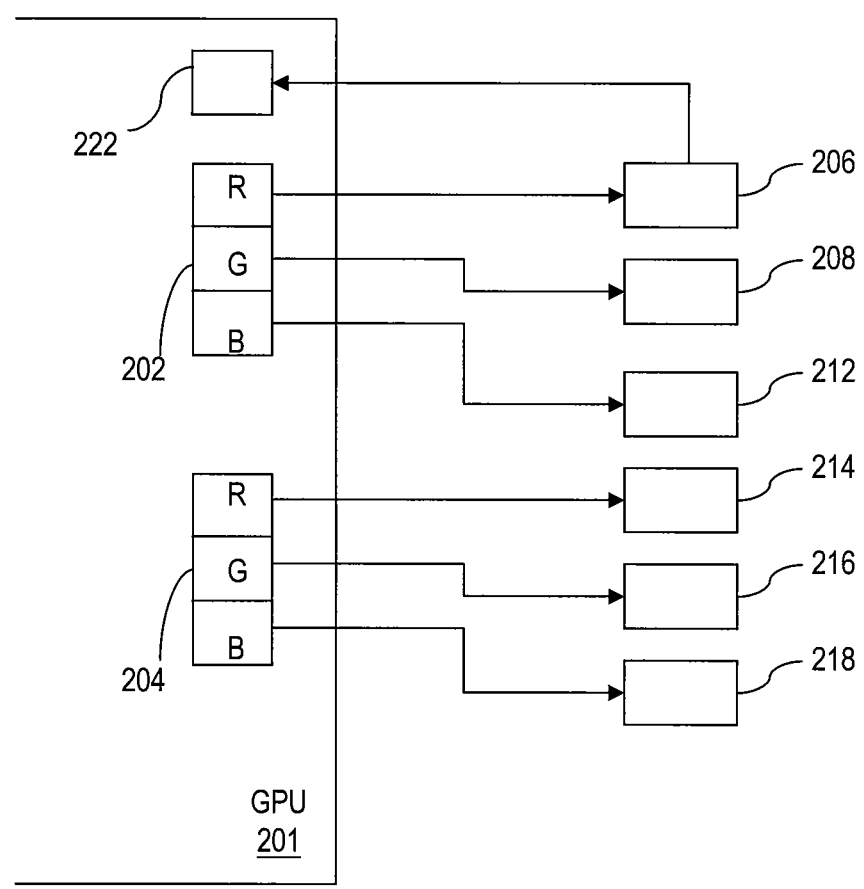
FIG. 2 is a schematic diagram for illustrating outputting analog audio signals in a 5.1 surround sound environment according to one embodiment of the present invention.

In conjunction with FIG. 1, FIG. 2 is a schematic diagram 200 for illustrating outputting analog audio signals in a 5.1 surround sound environment according to one embodiment of the present invention. A 5.1 surround sound environment provides an audio data stream intended for five full channels, each of which corresponds to its respective speaker. The 5.1 surround sound environment may further include one low frequency effect (LFE) channel. To illustrate, the five full channels in the 5.1 sound environments may contain external audio devices 206, 208, 212, 214, 216, and 218 located at left front, right front, center, surround left, and surround right in relation to a listening audience. In one implementation, the external audio device is a speaker. A GPU 201 may detect the existence of an external audio device (such as the external audio device 206) to receive the GPU audio. In one implementation, the detection is performed through a general purpose input output (GPIO) pin 222 of the GPU 201. When a connection pin, which is connected to a pull-up resistor, of the external audio device 206 is in connection with the GPIO pin 222, the voltage level of the connection pin may be set to "high." In another implementation, the voltage level of the connection pin may be at "low." With this voltage level, the GPU 201 could verify the connection of the external audio device. In another implementation, the GPU 201 may poll the voltage level of the GPIO pin 222 periodically to determine the connection of the external audio device, or receive an interrupt indicative of the connection. An option to enable the output of the GPU audio may be provided by the application program 142. When the option is enabled and the GPU 201 detects the connection of external audio devices 206, 208, 212, 214, 216, and/or 218, an audio source (such as the audio source 158 in FIG. 1), which may have been processed by a core circuitry (not shown) of the GPU 201, may be outputted to a digital-to-analog converter (DAC) 202 and a DAC 204 of the GPU 201. The DAC 202 and the DAC 204 may be configured to convert the processed audio source to a predetermined analog format. The DAC 202 and the DAC 204 may generally be used for the output of red (R), green (G), and blue (B) pixel signals of the graphics data. The GPU 201 may have the DAC 202 and the DAC 204 available for the processing and the transmission of the GPU audio while utilizing other I/O ports for the output of the graphics data. This arrangement may work especially well in a parallel architecture such as the Compute Unified Device Architecture (CUDA). One or more of the DAC 202 and the DAC 204 may also support a plurality of channels for the transmission of the GPU audio. For example, each of the channels used for the transmission of the R/G/B pixel signals may correspond to one channel of the GPU audio. In one implementation, a pair of DACs may be able to provide five full channels and one LFE to create the 5.1 surround sound environment. Though six channels are provided in FIG. 2, it is worth noting that the pins of the DAC 202 and the DAC 204 may be grouped together as one set of channels one of a single external audio device. For example, when the external audio device such as an earphone comprising a set of left and right channels, the DAC 202 may be configured to provide the output of the GPU audio for the left channel of the earphone, and the DAC 204 may be configured to provide the output of the GPU audio for the right channel of the same earphone.

Figure 3:
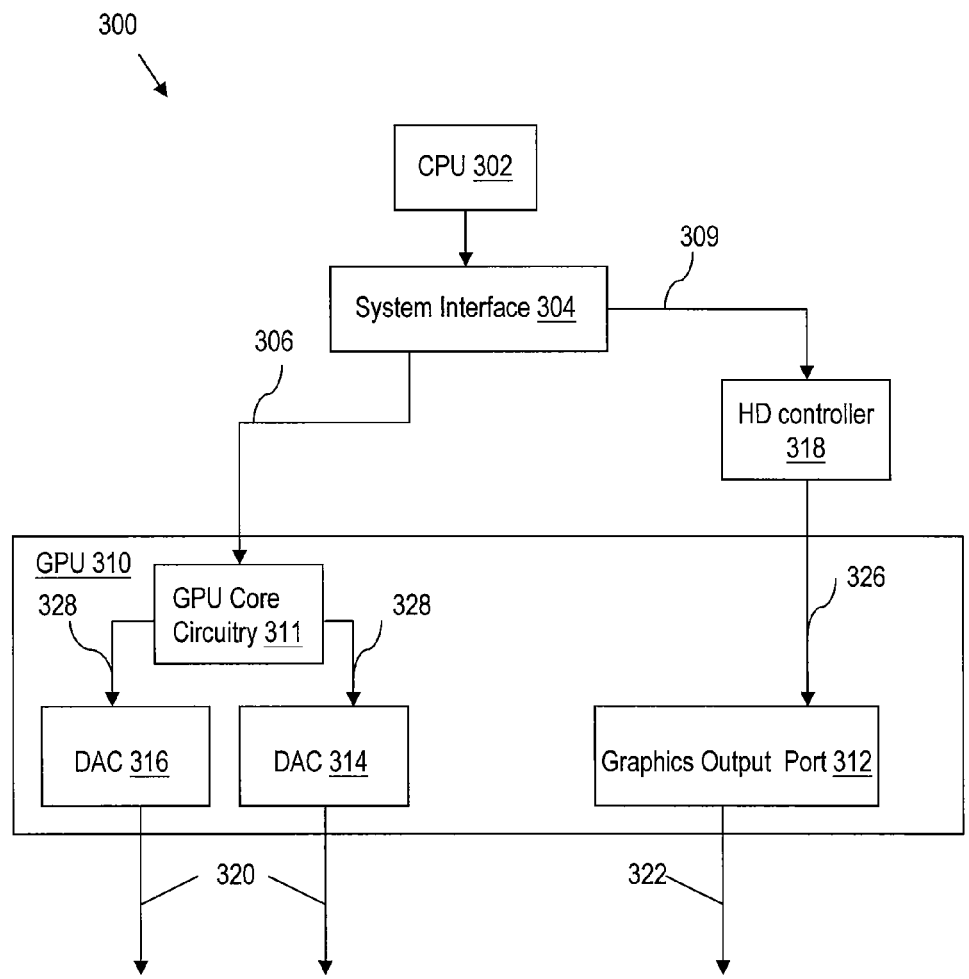
FIG. 3 is a schematic diagram illustrating different transmission paths for a first audio stream and a second audio stream according to one embodiment of the present invention.

FIG. 3 is a schematic diagram illustrating different transmission paths for a first audio stream 306 and a second audio stream 309 according to one embodiment of the present invention. When the option of outputting GPU audio is enabled and a connection of an external audio output device and a GPU is detected, the first audio stream 306 is routed to a core circuitry 311 of the GPU 310. In one implementation, the core circuitry 311 includes floating operators. Thereafter, a GPU audio 328 may be generated and sent to a first output port of the GPU 310. In one implementation, the first output port of the GPU 310 includes a DAC 314 and a DAC 316. The DAC 314 and the DAC 316 are further configured to convert the GPU audio 328 into its analog-based counterpart 320. The analog-based first audio stream 320 is further outputted to an external audio output device (e.g., the external audio output device 152 in FIG. 1). The first audio stream 306, which is coordinated by a CPU 302, follows a first transmission path including a system interface 304, the core circuitry 311, and the first output port as an audio output port. It is worth noting that the processing performed by the core circuitry 311 may include compressing and decompressing the first audio stream 306.

On the other hand, the second audio stream 309 may be routed to and processed by a high definition (HD) controller 318. An audio output 326 of the HD controller 318 may include an HD-based second audio stream and a non-HD second audio stream. The output 326 may be routed to a second output port (such as the graphics output port 312) of the GPU 310 without going through the core circuitry 311. In one implementation, the second output port includes an internal flat panel (IFP) pin of the GPU 310. The second output stream 309 may follow a second transmission path to a display device (e.g., the display device 150 in FIG. 1) through the second output port 312. In one implementation, the second transmission path may include the system interface 304, the HD controller 318 and the second output port (graphics output port 312) of the GPU. Since the audio output 326 may not be processed by the core circuitry 311 of the GPU 310, the HD-based second audio stream and the non-HD second audio stream may be referred to as the aforementioned system audio. When the option of the output of the GPU audio is not enabled, no GPU audio is generated, and the system audio may be outputted along the second transmission path. In one implementation, the graphics output port 312 may process the audio output 326 (e.g., encoding) to generate another audio stream 322 that is in compliance with the specification associated with the display device coupled to the graphics output port 312.

Figure 4:
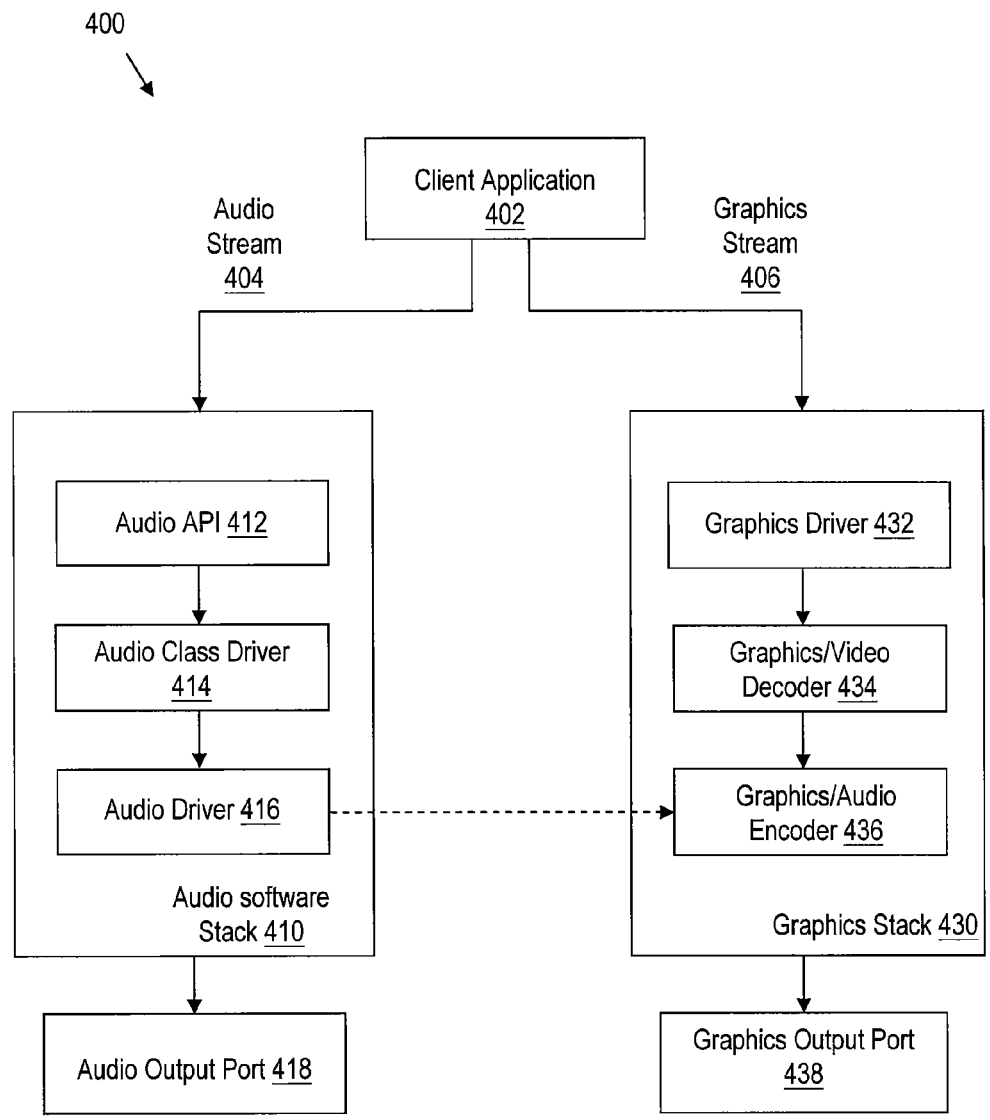
FIG. 4 is a schematic diagram illustrating an audio software stack and a graphics stack in a computing device configured to handle audio stream and graphics stream according to one embodiment of the present invention.

FIG. 4 is a schematic diagram illustrating an audio software stack and a graphics stack in a computing device configured to handle audio stream and graphics stream according to one embodiment of the present invention. An audio stream 404 is processed in an independent manner through an audio-dedicated driver stack, i.e. the audio software stack 410. The audio software stack 410 comprises an audio application programming interface ("audio API") 412, an audio class driver 414, and an audio driver 416. The audio software stack 410 may be provided with the OS of the computing device (e.g. the OS144 of FIG. 1). The client application 402 includes program calls to specific audio rendering functions defined by the audio API 412. In one implementation, the audio API 412 may include, for example, the DirectSound API provided by the Windows OS. The audio API 412 interacts with the audio class driver 414 to perform the tasks defined by the audio rendering functions. Based on the selected audio output, the audio class driver 414 may activate the corresponding audio driver 416 so that the audio stream 404 could be processed accordingly. The processed audio stream 404 may be outputted to an external audio device through an audio output port 418. In one implementation, the audio output port 418 includes a DAC. Alternatively, the processed audio stream 404 in the audio software stack 410 may also be outputted to a graphics stack 430.

The graphics stack 430 comprises a graphics driver 432, a graphics/video decoder 434, and a graphics/audio encoder 436. A graphics stream 406 may be processed through a separate graphics-dedicated driver stack, i.e. the graphics stack 430. The graphics driver 432 is responsible for rendering of the graphics stream 406. Before the graphics stream 406 can be processed by a GPU (e.g., GPU 310 in FIG. 3), it is decoded by the graphics/video decoder 434. After the processing of graphics stream 406 by the GPU is completed, the processed graphics stream 406 is then encoded by the graphics/audio encoder 436 before being outputted to a graphics output port 438. Optionally, the graphics/audio encoder 436 is also responsible for encoding the audio stream 404. The audio stream 404 is sent to the graphics stack 430 by the audio driver 416.

Figure 5:
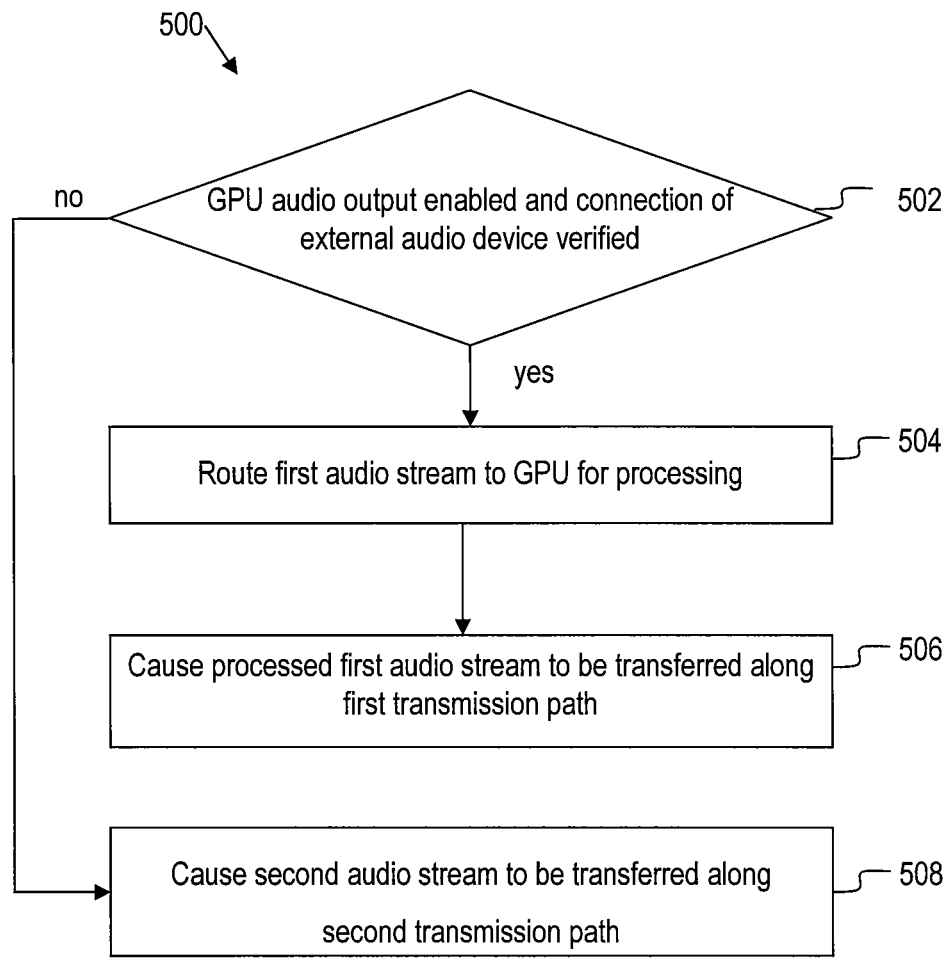
FIG. 5 is a flowchart illustrating a method for an audio driver in a computing device to support a GPU audio output on graphics processing unit according to one embodiment of the present invention.

In conjunction with FIG. 4, FIG. 5 is a flowchart illustrating a method 500 for an audio driver in a computing device to support a GPU audio output on graphics processing unit according to one embodiment of the present invention. In step 502, the audio driver is configured to determine whether an option of GPU audio output is enabled and a connection between an external audio device (e.g., external audio output device 152 in FIG. 1) and the graphics subsystem is present. If so, the audio driver may route a first audio stream to a GPU for processing in step 504. The audio driver then may also cause the audio stream that is processed by the GPU to be transferred along a first transmission path in step 506. In one implementation, the first transmission path includes an audio output port of the GPU (e.g., the audio output port 134 in FIG. 1). When the determination in the step 502 indicates that either the GPU audio output is not enabled or the connection between the external audio output device and the graphics subsystem is not present, in step 508 the audio driver may cause a second audio stream to be transferred along a second transmission path. In one implementation, the second transmission path includes a graphics output port of the GPU (e.g., the graphics output port 133 in FIG. 1).

While the forgoing is directed to implementations of the present invention, other and further implementations of the invention may be devised without departing from the basic scope thereof. For example, aspects of the present invention are implemented in a combination of hardware and software. One implementation of the invention may be implemented as a program product for use with a computer system. The program(s) of the program product define functions of the implementations (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are implementations of the present invention.

Therefore, the scope of the present invention is determined by the claims that follow.

We claim:

1. A method for processing audio data streams via a graphics processing unit (GPU) that resides in a computing device having a graphics subsystem, comprising:
    determining whether an application program that generates audio streams has enabled an option associated with processing the audio streams via the GPU and that a connection between a first external audio device and the graphics subsystem exists;
    if the option is enabled and the connection exists, then routing a first audio stream from a central processing unit to the GPU along a first transmission path if the option is enabled and the connection exists for processing by a plurality of threads executing on one or more thread processors included in the GPU, wherein the one or more thread processors are configured to encode or decode the first audio stream;
    causing the processed first audio stream to be transferred along the first transmission path to the first external output device, wherein the processed first audio stream is converted from a digital format to an analog format within the first transmission path; and
    if the option is not enabled or the connection does not exist, then routing a second audio stream from the central processing unit to the GPU along a second transmission path different than the first transmission path and comprising a second output port of the GPU; and
    causing the second audio stream to be transferred along the second transmission path to a second external output device.

2. The method of claim 1, wherein the first transmission path comprises a first output port of the GPU that converts the first audio stream from the digital format to the analog format.

3. The method of claim 1, wherein the second output port corresponds to a graphics output port including an internal flat panel (IFP) pin of the GPU.

4. The method of claim 1, wherein the second audio stream includes a high definition (HD)-based audio stream and a non-HD audio stream.

5. A computer system for supporting a graphics processing unit (GPU) audio output, comprising:
a central processing unit (CPU);
a system memory; and
a GPU that is configured to:
receive a first audio stream from the CPU along a first transmission path when a GPU audio output is enabled and the GPU is coupled to a first external output device;
process the first audio stream within a plurality of thread processors included in the GPU, wherein the one or more thread processors are configured to encode or decode the first audio stream;
transmit the first audio stream that is processed by the plurality of threads included in the GPU to the first external output device along the first transmission path, wherein the processed first audio stream is converted from a digital format to an analog format within the first transmission path;
receive a second audio stream from the CPU along a second transmission path different than the first transmission path when the GPU audio output is disabled or the GPU is not coupled to the first external device; and
transmit the second audio stream along the second transmission path to a second external output device, wherein the second transmission path comprises a second output port of the GPU.

6. The computer system of claim 5, wherein the first transmission path comprises a first output port of the GPU, and wherein the processed first audio stream is transmitted to the first output port of the GPU.

7. The computer system of claim 6, wherein the first output port is a Digital-to-Analog converter (DAC) of the GPU.

8. The computer system of claim 5, wherein the GPU is configured to detect the connection of the first external output device through a general purpose input output (GPIO) port of the GPU when a connection pin coupled to a pull-up resistor of the first external output device is coupled to the GPIO port.

9. The computer system of claim 5, further comprising a high definition (HD) controller for preparing a HD-based audio stream as the second audio stream.

10. The computer system of claim 9, wherein the HD controller is further configured to prepare a non-HD audio stream as the second audio stream.

11. The computer system of claim 5, wherein the second output port corresponds to a graphics output port including is an internal flat panel (IFP) pin of the GPU.

12. A non-transitory computer readable medium containing a sequence of instructions for supporting a graphics processing unit (GPU) audio output on a GPU in a computing device having a graphics subsystem, wherein the sequence of instructions when executed by a processing unit, causes the processing unit to:
route a first audio stream from the processing unit through a systems interface to the GPU of the graphics subsystem along a first transmission path for processing within a plurality of thread processors included in the GPU when an option associated with the GPU has been enabled and a connection exists between a first external audio device and the graphics subsystem;
cause the processed first audio stream to be transferred along the first transmission path to a first external output device, wherein the processed first audio stream is converted from a digital format to an analog format within the first transmission path;
route a second audio stream from the processing unit through a systems interface to the GPU along a second transmission path different than the first transmission path;
determine that an option of the GPU audio output is not enabled or that the graphics subsystem is not coupled to the first external output device; and
cause the second audio stream in response to the determination to be transferred along the second transmission path to a second external output device, wherein the second transmission path comprises a second output port of the GPU.

13. The computer readable medium of claim 12, wherein the first transmission path comprises a first output port of the GPU that converts the processed first audio stream from the digital format to the analog format.

14. The computer readable medium of claim 13, wherein the sequence of instructions when executed by a processing unit, causes the processing unit to determine that an option of the GPU audio output is enabled and the graphics subsystem is coupled to the first external output device.

15. The computer readable medium of claim 12, wherein the second output port of the GPU corresponds to a graphics output port including an internal flat panel (IFP) pin of the GPU.

16. The method of claim 1, wherein the plurality of threads included in the GPU process the first audio stream by performing encoding and filtering operations on the first audio stream.

17. The method of claim 1, wherein determining that a connection between a first external audio device and the graphics subsystem exists comprises determining that a connection pin coupled to a pull-up resistor of the first external output device is coupled to a general purpose input output (GPIO) port of the GPU.

18. The computer readable medium of claim 12, wherein determining that a connection between a first external audio device and the graphics subsystem exists comprises determining that a connection pin coupled to a pull-up resistor of the first external output device is coupled to a general purpose input output (GPIO) port of the GPU.

19. The system of claim 5, wherein the first audio stream comprises a plurality of audio channels, and the GPU is further configured to transmit each of the audio channels over a different pixel signal channel outputted by the GPU.

* * * * *

UNITED STATES PATENT AND TRADEMARK OFFICE
CERTIFICATE OF CORRECTION

PATENT NO. : 9,165,394 B2
APPLICATION NO. : 12/578385
DATED : October 20, 2015
INVENTOR(S) : Shany-I Chan et al.

Page 1 of 1

It is certified that error appears in the above-identified patent and that said Letters Patent is hereby corrected as shown below:

In the claims,

Column 7, Line 52, Claim 11, please delete "is".

Signed and Sealed this
Twenty-ninth Day of March, 2016

Michelle K. Lee
*Director of the United States Patent and Trademark Office*